United States Patent [19]

Bailey

[11] Patent Number: 4,574,447

[45] Date of Patent: Mar. 11, 1986

[54] DEVICE FOR INSERTING A BUSHING INTO A SOCKET

[76] Inventor: Walter L. Bailey, 8120 Donnawood Way, Orangevale, Calif. 95662

[21] Appl. No.: 702,805

[22] Filed: Feb. 19, 1985

[51] Int. Cl.[4] .............................................. B23P 19/04

[52] U.S. Cl. .......................................... 29/234; 29/263

[58] Field of Search .......................... 29/234, 263, 256

[56] References Cited

U.S. PATENT DOCUMENTS

| | | | |
|---|---|---|---|
| 2,647,556 | 8/1953 | Courtney | 29/234 |
| 3,123,901 | 3/1964 | Traugott | 29/263 |
| 3,139,677 | 7/1964 | Goldstein | 29/234 |

*Primary Examiner*—Robert C. Watson

*Attorney, Agent, or Firm*—Lothrop & West

[57] ABSTRACT

A body having parallel, flat ends and a through bore of a conical configuration is placed with the small end of the conical bore against and in alignment with a socket. The bushing, having an elastomer on its exterior, is placed with its end in the upper end of the body bore. A bolt head abuts the end of the bushing. The bolt passes through the bushing, the body and the socket. When a nut threaded on the bolt is turned, the bushing is pulled through the body and is subjected to tension and elongation. This reduces the diameter of the elastomeric part of the bushing to fit into the socket. The parts effecting the tensioning are then removed from the socket and bushing. The bushed socket can be placed into service.

1 Claim, 7 Drawing Figures

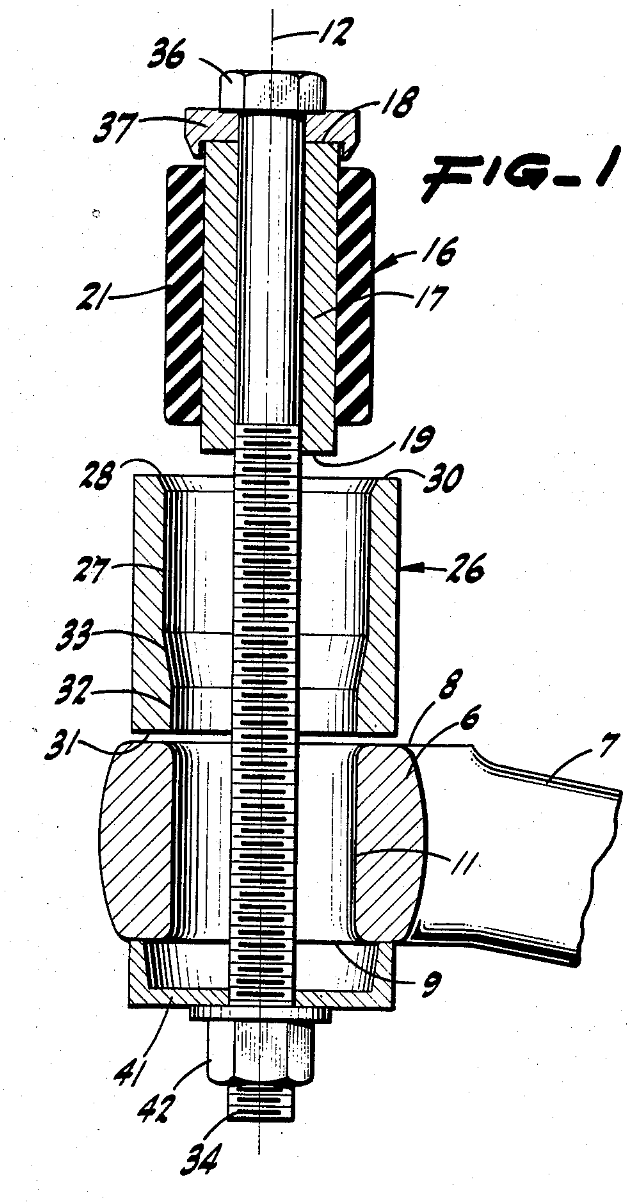
FIG-1
FIG-2
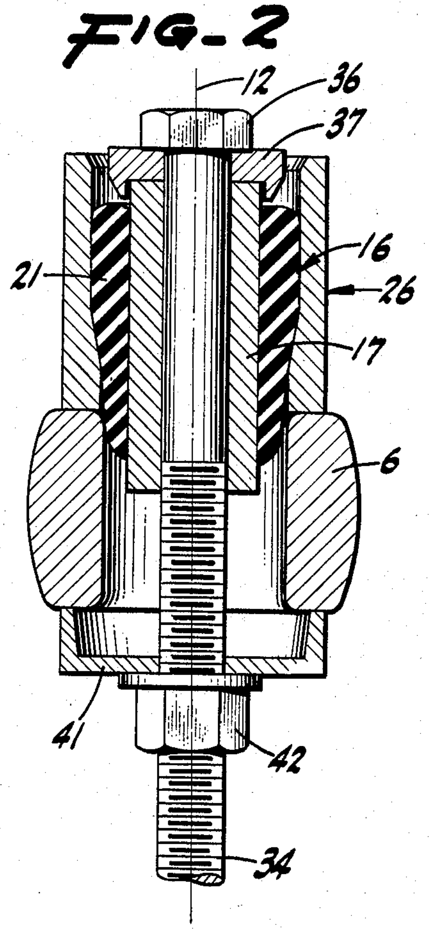
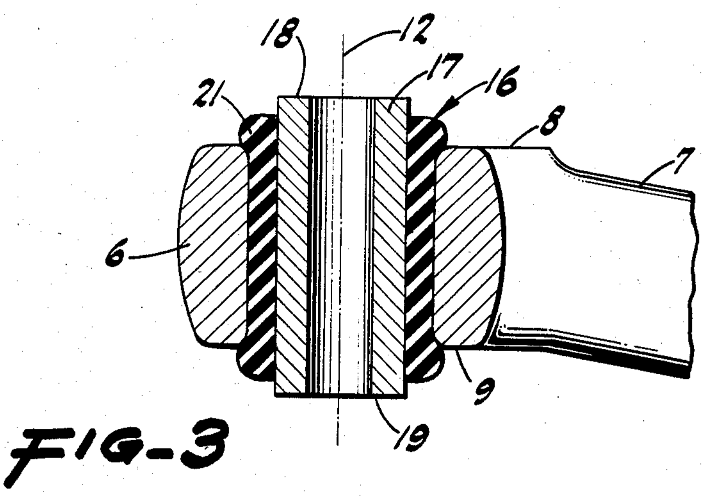
FIG-3

DEVICE FOR INSERTING A BUSHING INTO A SOCKET

BRIEF SUMMARY OF THE INVENTION

To put a circular-cylindrical bushing having a stiff cylindrical center tube and an attached elastomeric covering of a predetermined diameter into a circular-cylindrical socket of less than the predetermined diameter, there is provided a circular-cylindrical, stiff body having a tapered bore at one end about of the predetermined diameter and at the other end of about the diameter of the socket. The transition in dimension preferably is made by an internal conical surface between the ends of the sleeve. A bolt extending through the socket and the bushing and the body has a head engaged with one end of the bushing. A nut threaded on the bolt is engaged with the far end of the socket. When the nut is tightened on the bolt, the bushing is pulled axially through the body into the socket. The elastomer is axially stretched and deformed between the tube and the conical surface and so is temporarily reduced in diameter easily to enter the socket.

Prior Art

No particularly pertinent prior art is presently known to the applicant.

BRIEF DESCRIPTION OF THE SEVERAL VIEWS OF THE DRAWINGS

FIG. 1 is an exploded view in cross-section of various components of the device prior to assembly of the bushing in the socket.

FIG. 2 is a view comparable to FIG. 1 but showing the parts in partially assembled position.

FIG. 3 is a cross-section of the parts in assembled condition.

DETAILED DESCRIPTION

Figure 4:
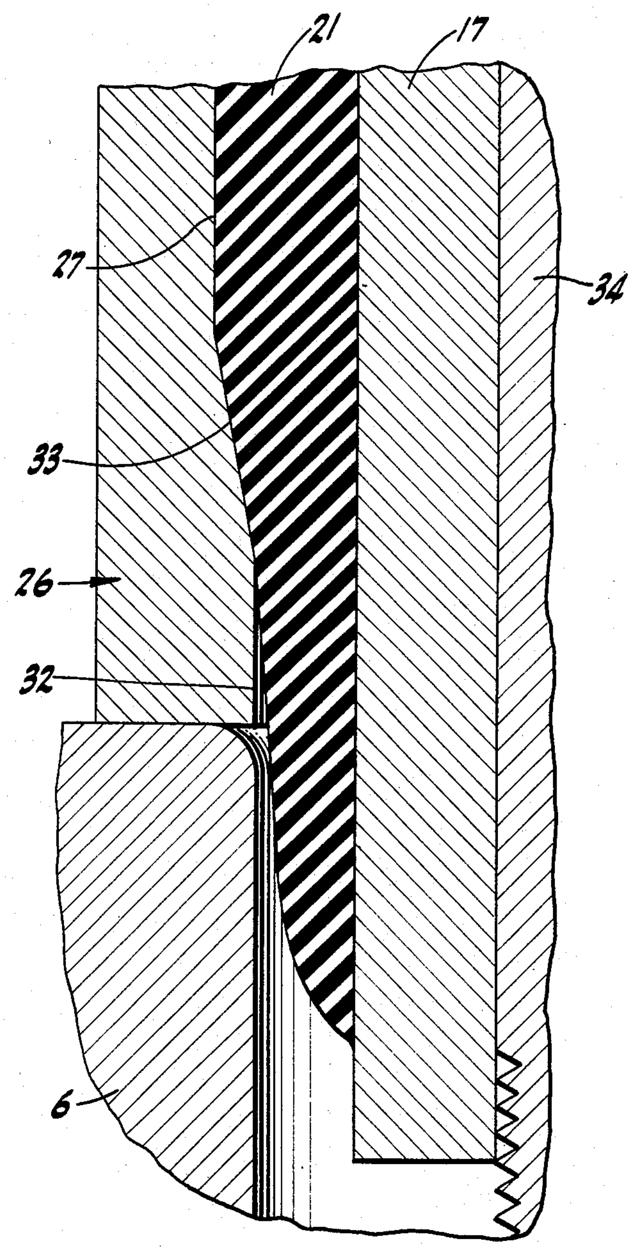
FIG. 4 is a view comparable to the upper portion of FIG. 2 but to an enlarged scale.
Figure 5:
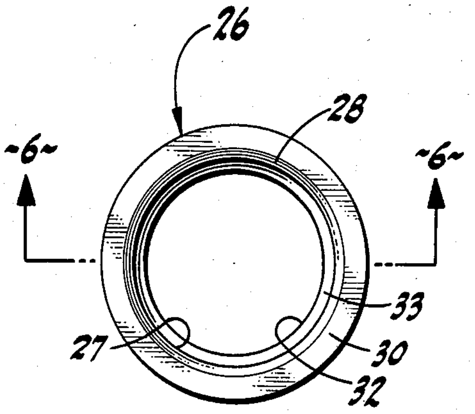
FIG. 5 is a plan of the body.
Figure 6:
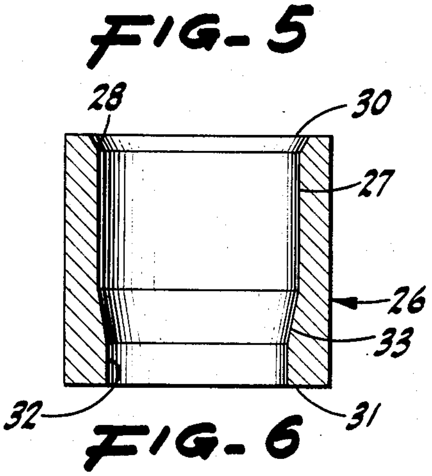
FIG. 6 is a cross-section, the plane of which is indicated by the line 6—6 of FIG. 5.
Figure 7:
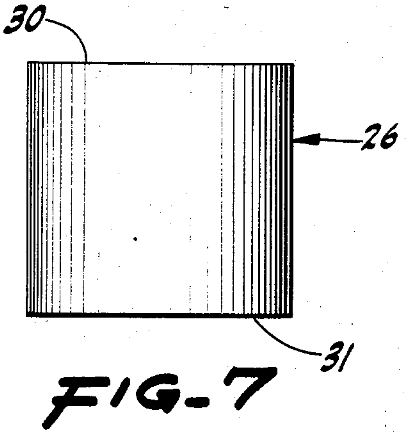
FIG. 7 is a side elevation of the structure of FIG. 6.

There are many mechanisms involving some sort of a cylindrical socket into which a bushing, often a renewable bushing, must be positioned for long wear, close fit, satisfactory performance and the like. Usually such bushings are pressed into the socket by considerable force. This is satisfactory where press equipment is available, but in many repair environments no such press is available and the job of assembling a new bushing into a receiving socket is quite difficult. This is largely because the outside diameter of the unstressed bushing is somewhat greater than the inside diameter of the receiving socket. This factor is particularly important where the bushing is a composite, including a stiff central member with an elastomeric surrounding.

In a typical instance, there is afforded a socket 6, for example, disposed at the end of an arm 7 and machined to provide an upper end face 8 that is planar and a lower end face 9 that is also planar and parallel to the upper face. Through the socket there is a bore 11 that is circular-cylindrical and of uniform diameter, the bore being concentric with a through axis 12 and more or less sharply merging with the faces 8 and 9.

To operate within the bore 11, there is provided a bushing 16 of a composite structure. The interior of the bushing is a stiff tube 17 usually of metal or the like of a circular-cylindrical configuration concentric with the axis 12. The bushing has planar ends 18 and 19 normal to the axis. Surrounding and usually vulcanized to the metal member or tube 17 is a cylindrical, elastomeric sleeve 21 conveniently of rubber and usually of lesser axial length than the length of the inner tube 17.

Customarily, the outside diameter of the bushing, particularly of the elastomeric portion thereof, is somewhat greater than the inside diameter of the bore 11.

In order to assemble the bushing 16 and the socket 6 satisfactorily, I particularly provide a special body 26. This is customarily made of any stiff or rigid material, especially metal or hard plastic. The body 26 externally is circularly cylindrical about the axis 12 and has a compound, through bore made up of an upper bore 27 that is circular-cylindrical about the axis and is of about the same diameter as the external diameter of the sleeve 21. Preferably, there is a chamfer 28 at the top entrance of the bore 27 merging with the top surface 30 of the body. The other end 31 of the body is planar and is also normal to the axis 12 and merges with the lower end 32 of the through bore. This lower portion 32 of the through bore is of about the same internal diameter as the bore 11 and is somewhat less than that of the upper bore 27.

Forming part of the through bore and intermediate the two bores 27 and 32 to effectuate a merger thereof is a conical surface 33 defining a truncated cone that converges in the direction of the smaller end 31.

In the use of this structure, the body 26 is placed concentrically on the upper end of the socket 6, as shown in FIG. 2, and the bushing 16 is started through the bevel or chamfer 28 into the upper end or larger bore 27 of the body. This is an easy fit and is readily accomplished.

Inserted through the bushing tube 17 and through the body 26 as well as through the socket 6 is a long threaded bolt 34 or rod. Preferably, interposed between the head 36 of the bolt and the upper end of the bushing 16 is a centering washer 37 bearing against the end of the bushing tube 17. A similar, recessed washer 41 is put over the lower end of the rod (usually with a plain washer also), and a nut 42 is applied. Thereupon the nut 42 is tightened. This advances the bushing 16 downwardly into the body 26. As the bushing proceeds to and through the conical portion 33, its leading portion externally meets some resistance to the axial movement. That is, as the bushing 16 is drawn down, the outer, elastomeric sleeve 21 meets increased resistance to motion in the conical section 33, but the metallic center tube 17 tends to continue on. This compresses and retards the elastomer near and above the cone 33 and places the elastomer below the cone 33 in tension. The tension elongates or stretches the elastomer and so reduces the outer diameter of the stretched elastomer (see FIG. 2) for ready entrance into the socket 6. The leading portions are drawn into contours approximately as shown in FIGS. 2 and 4. Thus the bushing sleeve 21 with the deformed elastomeric portion is drawn readily downwardly into and through the bushing until the sleeve 21 at its lower end is well within the recessed lower washer 41 and the bushing 16 as a whole is centered in the socket 6 in its desired, normal location. By that time, the bushing has entirely or substantially left the body 26. The elastomer then presses evenly against its surroundings and takes on a uniform, compressed configuration, except possibly for some expansion at the extreme ends. The nut 42 is then backed off of the bolt 34, the socket washer 41 is withdrawn, and the bolt and the body 26 are lifted out of the installed bushing. The parts can then be put into regular service, as required.

I claim:

1. A device for inserting a metal-elastomer cylindrical bushing axially into a smaller cylindrical socket comprising a body having a bore therethrough and adapted to be disposed with one end thereof against and in alignment with said socket and with the other end thereof against and in alignment with said bushing, means including the wall of said body bore defining the frustum of a cone converging toward said socket end, a threaded bolt adapted to extend axially through said aligned bushing and said body and said socket, means on said bolt and engaging one of said bushing and said socket, and a nut engaging said threaded bolt and engaging the other of said bushing and said socket for moving said elastomer of said bushing axially through said cone and said bushing into said socket.

* * * * *